United States Patent [19]
Piëch

[11] 3,742,646
[45] July 3, 1973

[54] ARRANGEMENT FOR ELECTRICALLY ACTUATED WINDOWS OF VEHICLES, ESPECIALLY MOTOR VEHICLES

[75] Inventor: Ferdinand Piëch, Stuttgart-Nord, Germany

[73] Assignee: Firma Dr. -Ing. H.C.F. Porsche KG, Stuttgart-Zuffenhausen, Germany

[22] Filed: June 9, 1971

[21] Appl. No.: 151,221

[30] Foreign Application Priority Data
June 9, 1970   Germany............... P 20 28 195.2

[52] U.S. Cl. ................................. 49/28, 49/349
[51] Int. Cl. ........................... E05f 11/38, E05f 15/16
[58] Field of Search .......... 49/26–28, 349, 350, 357

[56] References Cited
UNITED STATES PATENTS
2,817,512   12/1957   Christen................................ 49/26
2,324,145   7/1943   Floraday................................ 49/26

Primary Examiner—J. Karl Bell
Attorney—Craig, Antonelli & Hill

[57] ABSTRACT

A switch arrangement for electrically actuated window-panes of vehicles, especially motor vehicles in which the drive motor is controlled by switches arranged in the passenger space and includes window actuating switches and a safety device with a slip clutch which responds and interrupts the drive when a predetermined resistance to movement of the windowpane occurs; the slip clutch, however, is bypassed automatically when the window-actuating switch energizing the window drive motor in the window-opening direction is closed.

6 Claims, 1 Drawing Figure

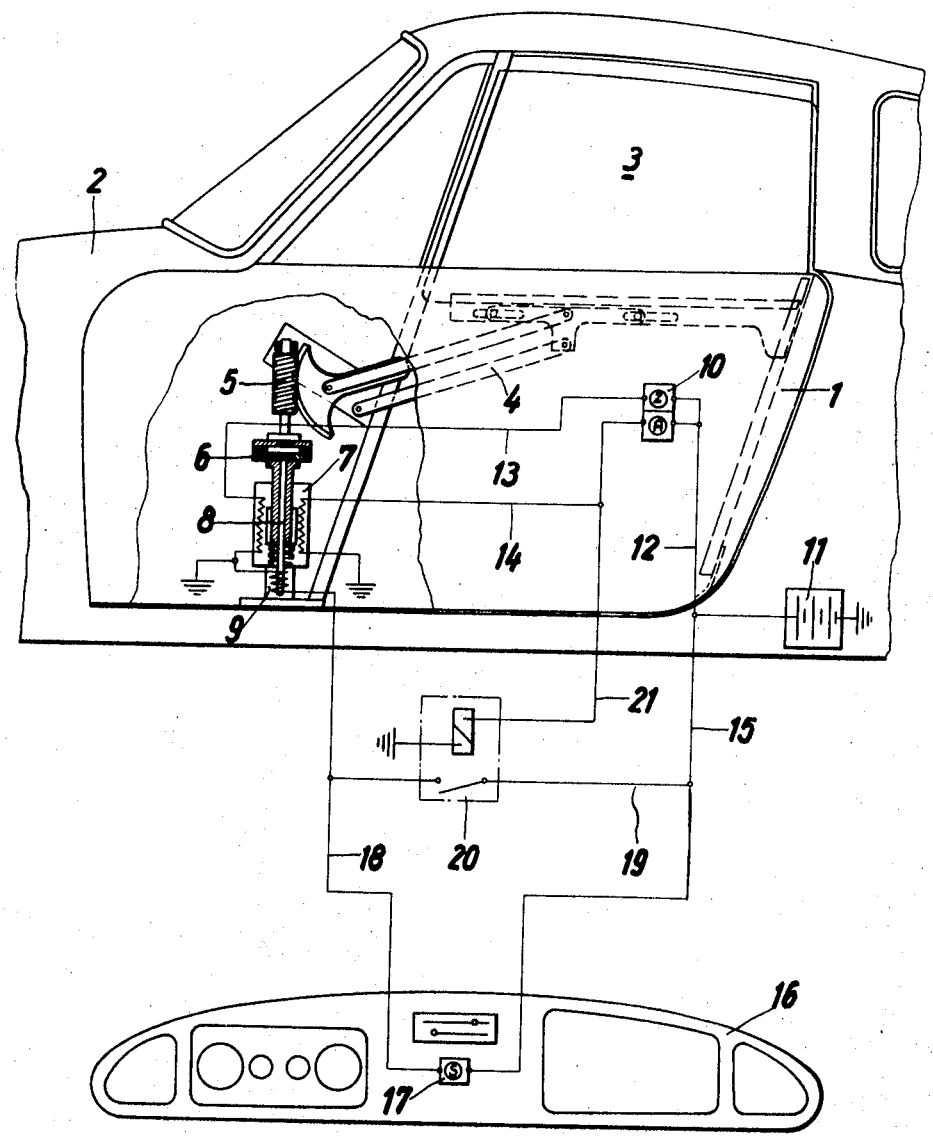

ARRANGEMENT FOR ELECTRICALLY ACTUATED WINDOWS OF VEHICLES, ESPECIALLY MOTOR VEHICLES

The present invention relates to a switch arrangement for electrically actuated windowpanes of vehicles, especially of motor vehicles, in which the driving motor is controlled by switches arranged in the passenger space and includes a safety mechanism containing a friction clutch which upon the occurrence of a non-permissively high resistance to movement of the windowpanes responds and interrupts the drive.

The object of the present invention is a simple switch arrangement provided with a safety device for electrically actuated windowpanes of motor vehicles.

The switch arrangement in prior devices includes switches arranged respectively at the vehicle doors which includes two push buttons that serve for the opening and closing of the windowpanes. During the actuation of the switch, an energizing circuit is closed whereby the electric drive motor of the window lifter linkage is set into operation. Depending on which push button of the switch is actuated, the drive motor is reversed in its direction of rotation and brings about an opening or closing of the window. The connection of the drive shaft of the driving motor to the gear of the window lifter linkage takes places by way of a slip clutch which, upon attain a predetermined resistance to movement of the windowpane, disengages the drive connection so that an injury danger by jamming, for example, of the fingers of a hand between the window and the door frame is prevented. A safety switch preferably arranged in the center of the dashboard is connected with an electromagnetic switch of the drive motor. During actuation of the safety switch, the electromagnetic switch is energized whereby a bridging element locks the slip clutch and thus makes also possible an opening or closing of frozen windows. Due to the arrangement of the safety switch in the center of the instrument panel, the safety switch and the window switch have to be actuated with both hands for the actuation of the windowpane so that an injury danger is far-reachingly eliminated. This construction of a switch arrangement for electrically actuated windowpanes has proved satisfactory in practice and has fulfilled far-reachingly the safety regulations for such types of window actuations of motor vehicles; however, for example, with frozen-up, closed windows, the opening thereof by an actuation requiring both hands is both complicated and annoying, particularly if, for example, the driver wants to open the window only during the drive and for that purpose has to stop in order to open with both hands one of the windows by the simultaneous actuation of the window switch and of the safety switch.

The present invention, in contrast thereto, is concerned with the task to so construct the switch arrangement for electrically actuated windowpanes by simple means that the opening of jammed or frozen-up windowpanes is made possible by actuation with a single hand, utilizing the full torque of the driving motor whereby during the closing of the window the described safety mechanism remains fully effective.

The underlying problems are solved according to the present invention in that the safety switch coordinated to the slip clutch is adapted to be bridged or by-passed in the opening direction of the window by a control means, such as a relay, a diode or the like, interconnected between the switch of the window actuation and the shifting relay of the slip clutch.

The advantages attainable with the present invention consist in particular in that by the described switch arrangement, the opening of the windowpane always takes place with the full torque available from the drive motor and by the mere actuation of the switch arranged at the vehicle door. The slip clutch thereby becomes effective only in the closing direction of the windowpane if a non-permissively high resistance to movement occurs at the windowpane. The slip clutch, however, may also be by-passed manually in the closing direction of the windowpane in that the actuating person simultaneously actuates with both hands the safety switch at the instrument panel and the closing switch of the window actuation at the door. The full torque of the driving motor is always effective on the window lift linkage both during the opening as well as during the closing of the window-pane by by-passing or bridging the slip clutch, however, the full torque is available automatically during opening and by actuation with only a single hand whereas during closing it is available manually only by actuation with both hands. An erroneous handling of the windowpane actuation and the injury danger resulting therefrom are avoided thereby with certainty.

These and further objects, features and advantages of the present invention will become more obvious from the following description when taken in connection with the accompanying drawing which shows, for purposes of illustration only, one embodiment in accordance with the present invention, and wherein:

The single FIGURE is a side elevational view of a motor vehicle with parts thereof broken away, illustrating schematically the switch arrangement of an electric window actuating system for a motor vehicle door in accordance with the present invention.

Referring now to the single FIGURE of the drawing, a windowpane 3 is vertically displaceably guided within a door 1 of a motor vehicle 2 and is connected with a window lifter linkage 4 of any conventional construction. The window lifter linkage 4 includes a gear 5 which is connected by way of a slip clutch 6 with an electric drive motor 7 reversible in its direction of rotation. The slip clutch 6 is so constructed that during normal operating conditions the torque of the driving motor 7 is transmitted to the window lifter linkage 4, whereas in case of an increased resistance to movement of the windowpane 3 in the closing direction thereof the connection between the driving motor 7 and the gear 5 is disengaged. The slip clutch 6 is further provided with a by-pass or bridging element 8 of conventional construction which permits a by-passing of the slip clutch 6 by way of a shifting relay 9. A switch 10 is arranged at the door 1 of the motor vehicle which includes two push buttons A and Z that serve for the opening and closing of the windowpane 3. The push buttons A and Z of the switch 10 are connected with a voltage source 11 by way of a line 12. Two electric lines 13 and 14 intended for a respective direction of rotation of the driving motor 7 lead from the push buttons A and Z to the driving motor 7. A further line 15 connected with the voltage source 11 leads to a safety switch 17 mounted at the instrument panel 16 of the motor vehicle 2 and from there by way of a further line 18 to the shifting relay 9 of the by-pass element 8. A by-pass line 19 is arranged between the lines 15, 18 of the safety switch 17. The by-pass line 19 is provided with a relay 20 which is connected by way of a further electric line 21 with the line 14 of the switch 10 leading to the driving motor 7 and is controlled by way of the same.

The opening of the windowpane takes place by pushing the push button A of the switch 10 at the door 1 of the motor vehicle. As a result thereof, the line 14 is connected with the voltage source 11 whereby the drive motor 7 is set into operation. Simultaneously therewith, a control current flows through the line 21 which energizes the magnetic core of the relay 20, whereby the contact of the relay 20 is closed and the line 18 of the shifting relay of the by-pass element 8 is connected with the voltage source 11 by way of the line 15. As a result thereof, the by-pass element 8 is displaced against the slip clutch 6 whereby the latter is by-passed or bridged and a non-rotatable connection from the driving motor 7 to the gear 5 is obtained thereby, i.e., a connection preventing relative rotation therebetween so that the windowpane 3 is opened with the full motor torque. This arrangement is primarily effective when the windowpane 3 is frozen-up due to iceing at the door frame of the motor vehicle 2 and a high motor torque is necessary for breaking the same loose.

The closing of the windowpane 3 takes place by depressing the push button Z of the switch 10. As a result thereof, the line 13 of the drive motor 7 is connected by way of the line 12 with the voltage source 11 so that the drive motor 7 is now set into motion in the reverse direction of rotation whereby the windowpane 3 closes. If the resistance to movement of the windowpane 3 should exceed a predetermined magnitude during such closing movement, then the slip clutch 6 disengages the connection between the drive motor 7 and the gear 5 and the windowpane 3 remains stationary in this position. The instantaneous position of the windowpane 3 can be manually determined both during the opening as well as during the closing by releasing the push button A or Z of the switch 10.

If the windowpane should become frozen in its open position, then upon the actuation of the push button Z of the switch 10, the slip clutch 6 becomes effective immediately whereby the windowpane remains in its then prevailing position. In order to eliminate this condition, a safety switch 17 is provided in the center of the instrument panel 16. Upon actuation of the safety switch 17, the line 18 of the shifting relay 9 of the by-pass element 8 is connected with the line 15 of the voltage source 11. As a result thereof, during the opening operation, the by-pass element 8 is displaced toward the slip clutch 6 whereby the latter is bridged and therewith the full torque of the drive motor 7 is available for breaking loose the windowpane 3. In order to preclude injuries by wedging or jamming of fingers of the hand or the like during the closing operation of the windowpane 3, when the slip clutch 6 is to be by-passed, the safety switch 17 and the switch 10 of the door have to be actuated simultaneously with both hands.

While I have shown and described only one embodiment in accordance with the present invention, it is understood that the same is not limited thereto but is susceptible of numerous changes and modifications as known to those skilled in the art, and I therefore do not wish to be limited to the details shown and described herein, but intend to cover all such changes and modifications as are encompassed by the scope of the appended claims.

I claim:

1. An arrangement for an electrically actuated windowpane of a vehicle, especially of a motor vehicle, in which a drive motor is controlled by switch means of a control means for opening and closing the windowpane, said switch means being arranged in the passenger space, and said control means including a safety means with a slip clutch means which upon occurrence of an excessively high resistance to movement of the windowpane responds and effectively interrupts the drive between the drive motor and a window-lifting means, characterized in that said control means includes further means for automatically rendering the safety means ineffective in the opening direction of a respectively actuated windowpane.

2. An arrangement according to claim 1, characterized in that said safety means includes a safety switch operable to effect a by-pass of the slip clutch means connected between the drive motor and the window-lifter means, said further means being operatively connected between a respective window-actuating switch means and the safety means for rendering the slip clutch means automatically inoperable exclusively in the opening direction of the window.

3. An arrangement according to claim 1, characterized in that the safety means includes by-pass means for rendering said slip clutch means ineffectual including a solenoid, window-actuating switch means for selectively energizing the drive motor in the window-closing and window-opening direction, and said further means being operatively connected between said window-opening switch means and said solenoid to render said by-pass means effective upon actuation of the window-opening switch means.

4. An arrangement for an electrically actuated window-pane of a vehicle, especially of a motor vehicle, comprising a drive motor for a window-lifting means of the windowpane for driving the window-lifting means in both the window opening and window closing directions, safety means including a slip clutch for interrupting the drive between the drive motor and the window-lifting means in response to an excessively high resistance to movement of the windowpane at any point throughout the entire path of movement thereof, and control means including switch means arranged in the passenger space for controlling the energization of said drive motor and further electrical means for automatically rendering the safety means ineffective in the opening direction of a respectively actuated windowpane.

5. An arrangement according to claim 5, wherein said control means includes a safety switch for said safety means, said safety switch being operable to effect a by-pass of the slip clutch arranged between the drive motor and the window-lifter means, said further means being operatively connected between a respective window-actuating switch means and the safety means for rendering the slip clutch automatically inoperable exclusively in the opening direction of the windowpane.

6. An arrangement according to claim 4, wherein said safety means includes by-pass means for rendering said slip clutch ineffectual including a solenoid, said switch means for controlling the energization of said drive motor including a window opening switch means and a window closing switch means for selectively energizing the drive motor in the window opening and window closing directions, said further means being operatively connected between said window opening switch means and said solenoid to render said by-pass means effective upon actuation of the window opening switch means.

* * * * *